April 12, 1960 H. M. ALEXANDER ET AL 2,932,129
METHOD OF BENDING AND CUTTING SHEETS
OF GLASS OR LIKE MATERIALS
Filed March 15, 1954 2 Sheets-Sheet 1

INVENTORS
Harold M. Alexander and
BY James D. Gwyn
Nobbe & Swope
ATTORNEYS

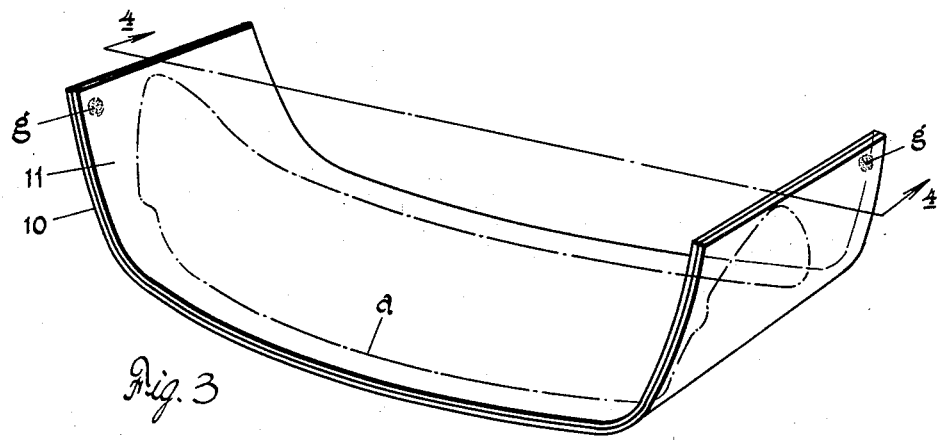
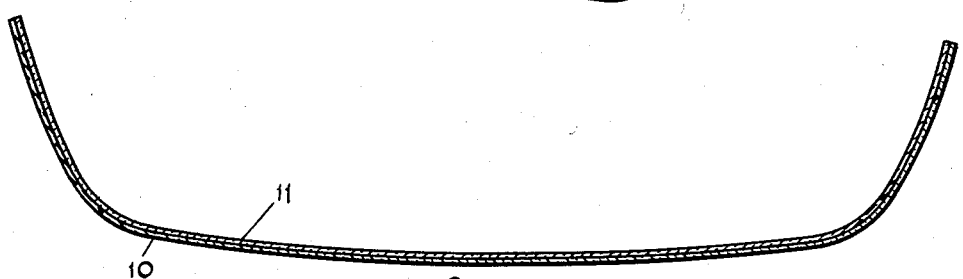
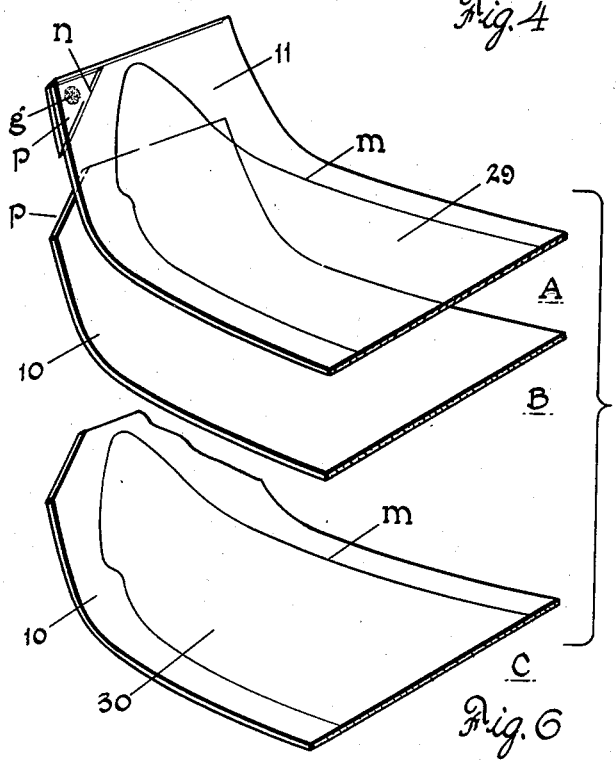
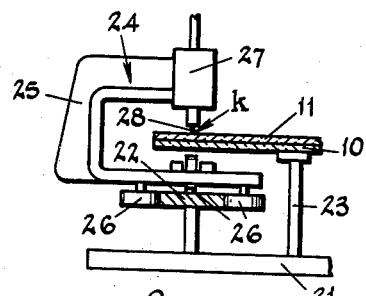
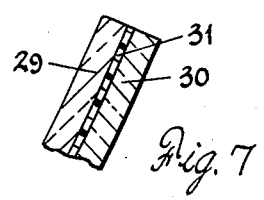

United States Patent Office 2,932,129
Patented Apr. 12, 1960

2,932,129

METHOD OF BENDING AND CUTTING SHEETS OF GLASS OR LIKE MATERIALS

Harold M. Alexander, Toledo, and James D. Gwyn, Perrysburg, Ohio, assignors to Libbey-Owens-Ford Glass Company, Toledo, Ohio, a corporation of Ohio Application March 15, 1954, Serial No. 416,176

6 Claims. (Cl. 49—79)

This invention relates broadly to the cutting of sheets or plates of glass, plastic or like materials. More particularly, the invention is concerned with a method of cutting to pattern a pair of glass sheets bent to a predetermined curvature.

Popular acceptance of the modern type automobile windshields is the result of an endeavor by car manufacturers to provide a more complete forward viewing area through which the occupants of a car, and particularly the driver, may have better observation of traffic and, at other times, the surrounding territory. To provide this wider visual area, windshields have now been provided to span the entire front of the car body, extend through the corners thereof and into the forward portions of the side walls. This requires that the glass sheets be shaped to a predetermined contour and at the same time lend themselves to further fabrication into laminated safety glass. Laminated glass is made up of two sheets or plates of glass with an interposed layer of non-brittle thermoplastic material, such as polyvinyl butyral resin, all bonded together under heat and pressure to form a composite, transparent structure.

Prior to laminating, however, it is necessary to form the sheets of glass, as by bending, to the desired curvature and, either before or after bending, to pattern-cut the pair of sheets to an outline conforming to the opening of the car body in which the finished windshield will be installed. The increasingly popular types of windshields require quite a deeply bent curvature and they have been identified, in some instances, as "wrap-around" or panoramic. More specifically, such bends involve a relatively shallow curve in the central areas of the glass sheets; more sharply bent outward areas corresponding to the corners of the car body and end areas or wings beyond the sharply bent areas having a relatively shallow curvature.

Now in order to obtain a pair of glass sheets shaped to such a deep or complex curvature, it has been found most advantageous to effect the bending of them prior to their being cut to pattern. This may be referred to as bending in the "blank" or "block" size. During the actual heating and shaping of the sheets on a suitable mold as it is conveyed through a heated furnace, there may be a slight movement of one sheet relative to the other which is highly objectionable if the sheets are cut to pattern before being bent. However, by employing the so-called "block size" bending procedure, slight relative movement between the sheets is not objectionable. The major areas of the pair of sheets will exactly conform to the curvature of the mold and from these areas the desired pattern shapes may be obtained. It is, however, essential that no relative movement between the bent sheets take places during their removal from the mold or during subsequent handling such as might destroy their bent nested relation prior to cutting to pattern.

This invention therefore has for its prime object to provide a novel method of maintaining a pair of bent glass sheets in nesting or matched conformity subsequent to the bending thereof and until they are pattern-cut.

Another object of the invention is to provide a novel method of obtaining exact duplicate pattern-cut sheets from a pair of bent glass blanks or block size sheets which have been bent to deep or complex curvatures.

Another object of the invention is to provide a method of securing a pair of bent glass sheets in conformity with one another, pattern cutting a required area from one of said sheets while it is secured to the other and then pattern cutting a duplicate area from the second sheet.

A further object of the invention is to provide a method of securing a pair of bent glass sheets in conformity with one another before they are removed from the mold on which they are bent; locating the pair of sheets in position to be cut, cutting an area of the desired outline from one sheet, detaching the cut sheet from the uncut sheet, and then cutting a duplicate area of the same outline from the second sheet before removing the same from cutting position.

Other objects and advantages will be found in the following description when read in connection with the accompanying drawings.

In the drawings, wherein like numerals are employed to designate like parts throughout the same:

Fig. 3 is a perspective view of the pair of glass sheets after they have been bent;

Fig. 4 is a longitudinal sectional view along line 4—4 of Fig. 3;

Fig. 5 is a diagrammatic view of an apparatus for cutting the glass sheets;

Fig. 6 is a series of fragmentary perspective views illustrating the sequences of cutting operations carried out in accordance with the invention; and Fig. 7 is a fragmentary section through a typical laminated glass unit, of which the pair of glass sheets are the outer component parts.

Figure 1:
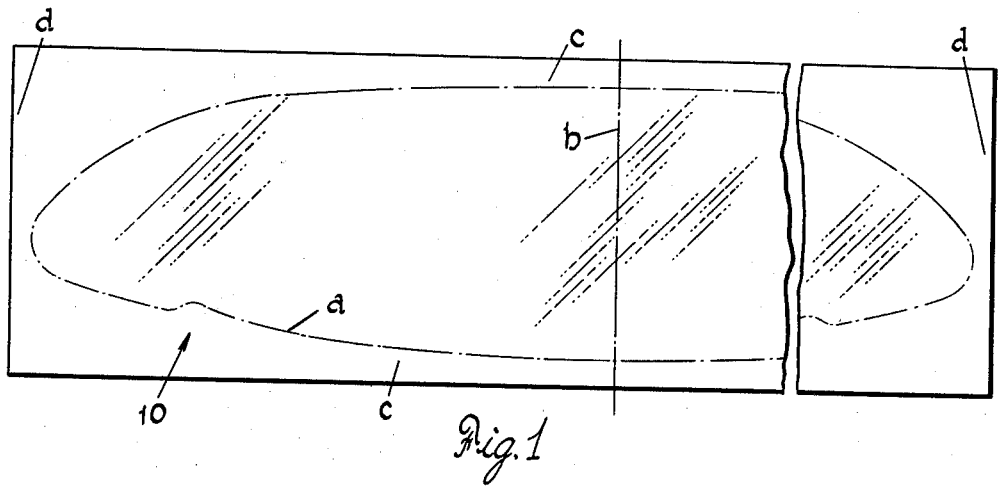
Fig. 1 is a view of a rectangular flat sheet of glass from which an outline is to be pattern-cut in accordance with this invention.

The fabrication of laminated safety glass is conventionally carried out by the matching of two sheets of glass according to optical requirements; forming a so-called sandwich by interposing between the glass sheets a layer of non-brittle thermoplastic material, such as polyvinyl butyral resin, and then subjecting the sandwich or laminate to heat and pressure within an autoclave to form a composite structure. When making laminated glass for automotive windows and/or windshields, the glass sheets, after being optically matched, are usually pattern-cut to the outline of the desired opening of the car body and, in the case of windshields, the pairs of sheets are bent to conform to the stream-lined contour of the forward end of the body. With the increasingly popular demand for one-piece windshields, however, the heretofore conventional methods of bending are not always satisfactory and new and improved forms of bending have been required to produce the desired curvatures.

As hereinbefore set forth, the newly developed one-piece windshields have been aptly described as "wrap-around" since they are formed by a relatively shallow central curved area and sharply rearwardly curving end areas. Since they span more of the forward area of the car, more complete, unobstructed forward vision is afforded, with added freedom of sight through the corner areas of the car. To produce windshields of this character requires initial bending of the glass sheets to a shallow curved central area and also bending of the end areas through a critically sharp curve. Heretofore, the length of sheets required, and particularly in view of the fact that they were pattern-cut before bending, created quite a serious problem of support for the sheets during bending with the result that the marginal edges of the sheets, when bent in pairs, were subject to some distortion and/or misalignment.

In order to solve this problem, it has been proposed, as previously pointed out, that the glass sheets be bent before they are pattern-cut to the desired outline. This is accomplished by placing two substantially rectangular glass sheets or "blanks," one upon the other, and bending them simultaneously upon a suitable contour or outline type mold. In this way, the supported marginal areas of the blanks will be outside of the central areas of the sheets which are subsequently pattern-cut from the blanks and which are then laminated together with the plastic interlayer to form a windshield of the desired outline and curvature. More than this, by reason of the fact that the blank size sheets are larger in both dimensions (longitudinally and transversely) than the outline to be pattern-cut therefrom, some relative shifting of the sheets during bending can be tolerated without actual loss of any of the central areas required for the outline. Obviously, a slight displacement of the sheets will merely involve the outer marginal areas thereof without disturbance of their finally nested relation or conformity of the sheets to one another and to the desired curvature. Once the pair of sheets is removed from the mold, however, and during the normal subsequent handling thereof, it is very necessary that this nesting conformity in pairs not be inadvertently destroyed before the actual cutting to outline is effected. As hereinafter described, this invention involves a novel method of positively maintaining a pair of bent glass sheets as a substantially integral unit until they are positioned in proper location on a cutting apparatus by which the outline of the desired pattern can be cut therefrom.

Referring now to the drawings, there is shown in Fig. 1 a rectangular sheet or plate of glass 10 which will hereinafter be referred to as the "glass blank." Within this blank, there is indicated in broken lines *a* the outline of a sheet to be pattern-cut therefrom, and which is preferably symmetrical on both sides of the medial line indicated at *b*. The outline *a* is of course representative of only one of many patterns that may be cut from the glass blank to form a windshield and along the sides or longitudinally disposed margins *c* and also at the ends *d* adequate space is provided for centralized location of the outline *a* within the blank.

Figure 2:
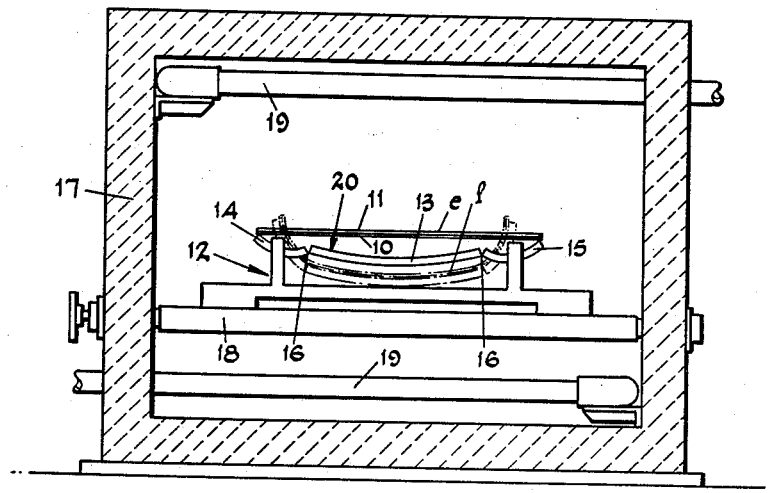
Fig. 2 is a transverse sectional view through a furnace within which a pair of glass sheets may be simultaneously bent to the desired curvature.

A pair of glass blanks, after being optically matched and washed, are located one upon the other on a suitable bending mold such as is shown in Fig. 2. The glass blanks are indicated 10 and 11 and the mold 12, upon which they are bent, is of the so-called peripheral or outline type including a central section 13 and end sections 14 and 15 hingedly connected to the central section as at 16.

After being properly located and supported at their ends on the mold, the blanks are carried into and through a furnace 17, upon a roller conveyor 18, the said furnace being provided with suitable heating means 19. From their initially located position in the flat, as indicated by the full lines *e* in Fig. 2, the glass blanks 10 and 11 are heated until they become softened and sag into contact with the shaping surface 20 of the mold sections 13, 14 and 15 as shown in broken lines *f*. Actually, when the glass is sufficiently softened by heating, it settles downwardly onto the mold, with the end sections 14 and 15 thereof acting to bend or "fold" the end portions of the glass blanks upwardly in relation to the more shallow curvature imparted to the glass blanks in their central areas as they settle onto the central section 13 of the mold. From the highly heated bending zone of the furnace 17, the bent glass blanks continue on through a zone of gradually decreasing temperature wherein the glass is slowly cooled and annealed.

At this stage in the processing of the glass blanks 10 and 11, they have been bent, by way of example, to a curvature as shown in Fig. 3 wherein it will be seen that the lower surface of the blank 11 is in contact with the upper surface of the blank 10 or, in other words, the two blanks are properly nested or in matched conformity with the contour of the mold shaping surface 20. In accordance with this invention, and before the bent glass blanks 10 and 11 are removed from the bending mold 12, after leaving the furnace 17, they are secured to one another in a manner to insure continuous nesting of their contiguous surfaces until they are subsequently detached from one another. Such securement may be effected in different ways, such as by sealing tape or the like adhered to the marginal edges of the sheets. However, in keeping with a preferred embodiment of the invention, it has been found more expeditious to insert a small amount or "spot" of a suitable adhesive or mastic between the pair of blanks in diagonally opposed corner areas thereof as is indicated at *g* in Fig. 3.

In practice, the adhesive, such as a fast drying rubber cement, plastic or other composition, may be injected between the two sheets of glass 10 and 11 by means of a suitable pressure gun or the like having an extremely thin tip. A hypodermic needle has been employed to great advantage to thus introduce a spot of the adhesive between the glass surfaces. This may be carried out by operators working at opposite sides of the furnace conveyor line and inserting the adhesive as quickly as possible after the mold, carrying the bent sheets, leaves the cooling zone of the furnace. The adhesive should also preferably be of a rapidly setting type. The pair of glass blanks may then be removed from the mold as a unit, inspected and prepared for the subsequent pattern cutting operation.

By not securing the glass blanks together until after they are bent, the blanks during bending are free to move relative to one another. More particularly, it has been found that during the actual bending or sagging of the sheets into conformity with the mold shaping surface and with one another, it is desirable that the upper blank be free to slidably move over the lower blank. Although such sliding movement is relatively slight, it is nevertheless important since respective portions of the two blanks may not sag downwardly in exact conformity with one another, and if the two blanks were tightly secured together, this sliding movement would be prevented.

The pattern cutting of glass blanks, either flat or after bending, has been conventionally carried out upon a cutting apparatus or table upon which a template is mounted, in one way or another, and having associated therewith a support for the glass blanks. As diagrammatically shown in Fig. 5, such an apparatus may comprise a base 21, having a template 22 in the form of a continuous bar-like track mounted thereupon. Within the template 22 is provided suitable means 23 for locating and supporting the sheets or blanks 10 and 11 as a unit in proper position with respect to the template.

By means of a cutting unit 24, a score line, indicated at *k*, is initially made in the upper glass sheet. Briefly, this cutting unit may comprise a frame 25 mounted to travel along the template 22 by suitably mounted rollers 26 and which supports a cylinder 27. Within the cylinder is an air, or otherwise actuated, mechanism by which the cutting wheel 28 is moved toward or away from the glass surface. Preferably, the frame 25 is supported by the rollers 26 on the template 22 so that the cutting wheel 28 will at all times be positioned in a plane normal to the surface of the glass. In other words, the template 22 is so formed as to conform not only to the outline of the pattern to be cut from the glass but also, in the case of bent glass, to the contour of the desired curvature. The cutting unit 24 will thus, in traversing the template, be carried circuitously around the glass sheet, with the cutting wheel 28 thereof perpendicular to the glass surface. It is usually customary, although not herein shown, to provide suitable holding means to secure the glass blanks on the supporting means 23 once they are properly located.

In carrying out the novel method of this invention, a pair of bent glass blanks 10 and 11, in their secured relation, are loaded onto the supporting means 23 of the cutting apparatus and properly located with respect to the template 22, with the glass blank 11 uppermost. The cutting unit 24 is then caused to traverse the template 22 and to effect scoring of the upper glass blank 11 along a line indicated at *m* in view A of Fig. 6. It will of course be understood that at this time, the blank 11 is still firmly adhered to the blank 10 by the diagonally located spots of adhesive *g* so that both blanks are in properly nested relation with one another.

Upon completion of the score line *m*, an operator manually makes a diagonal score line *n* at each of the corners of the lower blank 10 in which the spots *g* of adhesive are located, with said adhesive being disposed outwardly of the lines *n*, or well in the extreme corners *p* of the blanks. By exerting a small amount of pressure on these extreme corner areas *p*, they will be broken from the blank 10 along lines *n* but will remain attached to the upper blank 11. Until the blank 11 is scored to the desired outline, it is thus maintained in its nested relation to the blank 10. After the blank 11 has been scored and the corner portions *p* broken from the lower blank 10, the upper blank 11 is removed from the cutting apparatus without disturbing the lower blank. The pattern-cut area 29 is then broken out of the blank 11 by removing the glass outwardly of the score line *m*.

After the scored blank 11 is removed, the blank 10 will appear as in view B of Fig. 6 wherein it will be noted that the corner areas *p* have been removed therefrom. As shown in view C of Fig. 6, the blank 10 is then also scored along the line *m* by a second traversal of the cutting unit 24 around the template 22. And, since the cutter wheel 28 is maintained perpendicular to the surface of the blank, the edge produced, upon breaking of the blank 10 along the line *m* to obtain the pattern-cut sheet 30, will properly register with the similar edge produced upon the pattern-cut sheet 29. Thus, there is cut from the blanks 10 and 11 two pattern-cut sheets 29 and 30 of identical size, contour and curvature which lend themselves ideally to laminating with an interposed layer of plastic to form a composite structure such as shown in Fig. 7, wherein the two glass sheets 29 and 30 are bonded to a plastic interlayer 31.

While, in the preferred embodiment of the invention described above, the two glass blanks or block size sheets are secured to one another after bending and before being removed from the mold, the invention, in its broad aspect, also contemplates the securing of the blanks together before or during bending. For example, the glass blanks may be secured together during bending by placing a small amount of a glass frit or the like between the blanks, at the corners thereof, when they are still in the flat and initially placed on the mold, the melting temperature of the frit being such that when the glass blanks are heated to bending temperature the frit will melt and fuse the glass blanks together when cooled. After bending, the blanks can be removed from the mold as a unit and cut to pattern according to the method described above.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. The method of bending and cutting sheets or plates of glass and the like, comprising bending a pair of glass blanks, supported one upon the other, simultaneously to the desired curvature upon a mold, securing the blanks together before they are removed from the mold and after being bent, removing the blanks from the mold and placing them as a unit on a support to be pattern cut, scoring one of the blanks to a desired pattern outline, separating the scored blank from the unscored blank without disturbing the position of the latter with respect to the support, and then scoring the second blank to the same pattern outline as the first scored blank.

2. The method of bending and cutting sheets or plates of glass and the like, comprising bending a pair of glass blanks, supported one upon the other, simultaneously to the desired curvature upon a mold, securing the blanks together adjacent at least one edge thereof before they are removed from the mold and after being bent, removing the blanks from the mold as a unit, positioning the blanks relative to a template, scoring one of the blanks to a desired outline determined by the template, then cutting from the unscored blank the edge portion thereof where the blanks are secured together to separate them from one another, removing the scored blank from the unscored blank, and then scoring the second blank without disturbing the relative position of the latter with respect to the template to the same outline as the first scored blank.

3. The method of bending and cutting sheets or plates of glass and the like, comprising bending a pair of glass blanks, supported one upon the other, simultaneously to the desired curvature upon a mold, securing the blanks together adjacent at least one edge thereof, removing the blanks from the mold and placing them as a unit in position to be pattern cut, scoring one of the blanks to a desired pattern outline with a scoring tool movable in a fixed predetermined path, then cutting from the unscored blank the edge portion thereof where the blanks are secured together to separate them from one another, removing the scored blank from the unscored blank without disturbing the position of the latter with respect to the path of movement of the scoring tool, and then scoring the second blank to the same pattern outline.

4. The method of bending and cutting sheets or plates of glass and the like, comprising bending a pair of glass blanks, supported one upon the other, simultaneously to the desired curvature upon a mold, securing the blanks together adjacent at least one corner thereof before they are removed from the mold and after they are bent, removing the blanks from the mold as a unit and placing them as a unit on a support, securing the blanks on the support in a position relative to a template, scoring one of the blanks to a desired outline inwardly of the point at which the blanks are joined, then cutting from the unscored blank the corner portion thereof where the blanks are secured together to detach said blanks from one another, removing the scored blank from the unscored blank, and then scoring the second blank without disturbing the relative position of the latter with respect to the template to the same outline as the first scored blank.

5. The method of bending and cutting sheets or plates of glass and the like, comprising bending a pair of glass blanks, supported one upon the other, simultaneously to the desired final curvature upon a mold, securing the blanks together adjacent at least one corner thereof after said blanks are bent, removing the blanks from the mold and placing them as a unit in position to be pattern cut, scoring one of the blanks to a desired pattern outline with a scoring tool movable in a fixed predetermined path, then cutting from the unscored blank the corner portion thereof where the blanks are secured together to detach said blanks from one another, removing the scored blank from the unscored blank without disturbing the position of the latter with respect to the path of movement of the scoring tool, and then scoring the second blank to the same pattern outline.

6. In a method of forming a pair of matched bent glass sheets cut to pattern outline in which superimposed blank glass sheets are simultaneously bent into conformity with a bending mold and with one another and subsequently removed from the mold and scored to pattern outline, the steps of fixedly securing the blanks to one another prior to removal from the mold, removing the secured bent blanks from the mold and placing them as a unit a fixed position relative to a scoring tool movable in a fixed path, and scoring each blank without disturbing its position relative to the path of movement of the scoring tool.

References Cited in the file of this patent

UNITED STATES PATENTS

| | | |
|---|---|---|
| 1,889,881 | Thompson | Dec. 6, 1932 |
| 2,518,896 | Jendrisak | Aug. 15, 1950 |
| 2,595,402 | Morris | May 6, 1952 |
| 2,683,334 | Rugg et al. | July 13, 1954 |

UNITED STATES PATENT OFFICE
CERTIFICATE OF CORRECTION

Patent No. 2,932,129                                        April 12, 1960

Harold M. Alexander et al.

It is hereby certified that error appears in the printed specification of the above numbered patent requiring correction and that the said Letters Patent should read as corrected below.

Column 1, line 67, for "places" read -- place --; column 6, lines 24 to 27, for "the unscored blank, and then scoring the second blank without disturbing the relative position of the latter with respect to the template to the same outline as the first scored blank." read -- the unscored blank without disturbing the relative position of the latter with respect to the template, and then scoring the second blank to the same outline as the first scored blank. --; same column 6, lines 57 to 60, for "blank, and then scoring the second blank without disturbing the relative position of the latter with respect to the template to the same outline as the first scored blank." read -- blank without disturbing the relative position of the latter with respect to the template, and then scoring the second blank to the same outline as the first scored blank. --; column 7, line 11, after "unit" insert -- in --.

Signed and sealed this 27th day of December 1960.

(SEAL)
Attest:

KARL H. AXLINE                                               ROBERT C. WATSON
Attesting Officer                                        Commissioner of Patents